(12) United States Patent
Matsuo et al.

(10) Patent No.: US 9,012,033 B2
(45) Date of Patent: Apr. 21, 2015

(54) ALUMINUM ALLOY CLAD SHEET FOR HEAT EXCHANGERS

(75) Inventors: Hiroki Matsuo, Kariya (JP); Haruhiko Miyachi, Kariya (JP); Kenji Negura, Kariya (JP); Naoki Yamashita, Tokyo (JP); Yuji Hisatomi, Tokyo (JP); Yasunaga Itoh, Tokyo (JP)

(73) Assignees: Denso Corporation, Kariya, Aichi (JP); Sumitomo Light Metal Industries, Ltd., Minato-ku, Tokyo (JP)

( * ) Notice: Subject to any disclaimer, the term of this patent is extended or adjusted under 35 U.S.C. 154(b) by 0 days.

(21) Appl. No.: 12/798,151

(22) Filed: Mar. 29, 2010

(65) Prior Publication Data

US 2010/0266871 A1    Oct. 21, 2010

(30) Foreign Application Priority Data

Apr. 21, 2009 (JP) ................................ 2009-102819

(51) Int. Cl.
| | |
|---|---|
| B32B 15/20 | (2006.01) |
| C22C 21/02 | (2006.01) |
| B32B 15/01 | (2006.01) |
| C22C 21/10 | (2006.01) |
| F28D 1/03 | (2006.01) |
| F28F 19/06 | (2006.01) |
| F28F 21/08 | (2006.01) |

(52) U.S. Cl.
CPC ............... *C22C 21/02* (2013.01); *B32B 15/016* (2013.01); *C22C 21/10* (2013.01); *F28D 1/0308* (2013.01); *F28F 19/06* (2013.01); *F28F 21/089* (2013.01); *Y10S 165/905* (2013.01)

(58) Field of Classification Search
None
See application file for complete search history.

(56) References Cited

U.S. PATENT DOCUMENTS

| | | | |
|---|---|---|---|
| 6,316,126 B1 | 11/2001 | Hasegawa | |
| 7,018,722 B2* | 3/2006 | Toyama et al. | 428/654 |
| 2004/0038071 A1* | 2/2004 | Yoshidomi | 428/654 |
| 2004/0238605 A1* | 12/2004 | Nishimura et al. | 228/264 |
| 2007/0272681 A1* | 11/2007 | Yamanoi et al. | 219/615 |

(Continued)

FOREIGN PATENT DOCUMENTS

| | | |
|---|---|---|
| EP | 0 637 481 A1 | 2/1995 |
| EP | 1 090 745 A1 | 4/2001 |

(Continued)

OTHER PUBLICATIONS

English machine translation of JP 2004-225061. Aug. 2004.*

(Continued)

*Primary Examiner* — John J Zimmerman
(74) *Attorney, Agent, or Firm* — Flynn, Theil, Boutell & Tanis, P.C.

(57) ABSTRACT

An aluminum alloy clad sheet for heat exchangers includes a core material, a cladding material 1, and a cladding material 2, one side and the other side of the core material being respectively clad with the cladding material 1 and the cladding material 2, the core material containing 0.5 to 1.2% of Si, 0.2 to 1.0% of Cu, 1.0 to 1.8% of Mn, and 0.05 to 0.3% of Ti, with the balance being Al and unavoidable impurities, the cladding material 1 containing 3 to 6% of Si, 2 to 8% of Zn, and at least one of 0.3 to 1.8% of Mn and 0.05 to 0.3% of Ti, with the balance being Al and unavoidable impurities, and the cladding material 2 containing 6 to 13% of Si, with the balance being Al and unavoidable impurities, the cladding material 1 serving as the outer side of the aluminum alloy clad sheet during use.

29 Claims, 3 Drawing Sheets

(56) References Cited

U.S. PATENT DOCUMENTS

| | | | |
|---|---|---|---|
| 2009/0162686 A1* | 6/2009 | Matsukado et al. | 428/576 |
| 2009/0165901 A1* | 7/2009 | Koshigoe et al. | 148/535 |

FOREIGN PATENT DOCUMENTS

| | | | |
|---|---|---|---|
| EP | 2 243 589 A1 | 10/2010 | |
| JP | 11 343531 | 12/1999 | |
| JP | 2000 190089 A | 7/2000 | |
| JP | 2000 309837 A | 11/2000 | |
| JP | A-2004-225061 | 8/2004 | |
| JP | A-2005-016937 | 1/2005 | |
| JP | A-2005-307251 | 11/2005 | |
| JP | A-2005-314719 | 11/2005 | |
| JP | A-2007-178062 | 7/2007 | |
| JP | 2008 303405 A | 12/2008 | |
| WO | WO02/090031 A2 | 11/2002 | |
| WO | WO03/054242 A1 | 7/2003 | |

OTHER PUBLICATIONS

English machine translation of JP 2005-314719. Nov. 2005.*
English machine translation of JP 2008-303405. Dec. 2008.*

* cited by examiner

ALUMINUM ALLOY CLAD SHEET FOR HEAT EXCHANGERS

BACKGROUND OF THE INVENTION

The present invention relates to an aluminum alloy clad sheet for heat exchangers that exhibits excellent brazability and outer-side corrosion resistance, and is suitably used as a tube material or a tank or header material for an aluminum alloy heat exchanger that is produced by inert-gas brazing using a fluoride flux.

An aluminum alloy that is lightweight and exhibits excellent thermal conductivity is normally used for automotive heat exchangers (e.g., evaporator or condenser). A heat exchanger is normally produced by forming a refrigerant (i.e., working fluid) tube by bending a sheet material or layering sheet materials formed by press working, assembling a member such as a fin material with the refrigerant tube to form a given structure, and brazing the components in an inert gas atmosphere using a fluoride flux.

In recent years, since a reduction in weight has been desired for automotive heat exchangers along with a reduction in weight of automobiles, the thickness of the heat exchanger material has been reduced. Therefore, it is necessary to increase the strength of a sheet material used to form a refrigerant tube, or provide a thin material with formability, brazability, and corrosion resistance.

The outer side of an evaporator is exposed to a corrosive environment due to dew condensation water produced during use, and the outer side of a condenser is exposed to a corrosive environment during travel due to road splash that contains a road salt, for example. If the refrigerant tube is perforated at an early stage due to corrosion from the outer side, the refrigerant leaks so that the function of the heat exchanger is impaired. Therefore, the outer side of the refrigerant tube is provided with an anti-corrosive treatment to increase the life of the heat exchanger.

For example, a flat tube produced by forming a sheet material that is clad with an Al—Zn alloy (sacrificial anode material) may be used as the refrigerant tube, or a multi-port extruded tube may be used as the refrigerant tube. However, a heat exchanger generally has a structure in which a fin is bonded to the outer side of the refrigerant tube. When using the above method, since a filler metal is not provided on the outer side of the refrigerant tube, it is necessary to use a fin material that is clad with a filler metal. In this case, the self-corrosion resistance of the fin material may decrease due to the filler metal that remains on the surface of the fin, or the production cost of the heat exchanger may increase since the production cost of the clad fin material is higher than that of the bare fin.

When using a bare material for the fin that is bonded to the outer side of the refrigerant tube, the self-corrosion resistance of the fin can be improved. Moreover, the performance of the heat exchanger can be improved by utilizing a highly conductive material, and cost can be reduced as compared with the case of using a clad fin material. In this case, since it is necessary to provide a filler metal on the outer side of the refrigerant tube, a filler metal powder may be applied to the surface of the Al—Zn alloy, or a sheet material that is clad with an Al—Si alloy filler metal that contains Zn may be used. When applying a filler metal powder to the surface of the Al—Zn alloy, however, the production cost of the heat exchanger increases since the filler metal powder is expensive. When using a sheet material that is clad with an Al—Si alloy filler metal that contains Zn, since the molten filler metal that contains Zn flows during brazing, the amount of Zn that remains on the outer side of the refrigerant tube after brazing is not sufficient to provide a sacrificial anode material, the refrigerant tube may not exhibit sufficient corrosion resistance, or the molten filler metal that contains Zn may flow to the joint and cause preferential corrosion of the joint.

A method that forms a filler metal having low fluidity by adding Si at a low concentration to ensure brazability with a joint material has been known. For example, Si is added to an Al—Zn sacrificial anode material with which the outer side of the refrigerant tube is clad at a concentration lower than the Si concentration of an Al—Si alloy filler metal, and a bare fin material is bonded by melting part of the sacrificial anode material. A phenomenon in which Zn contained in the sacrificial anode material flows during brazing is suppressed by reducing the amount of liquid phase as compared with an Al—Si alloy filler metal so that a sufficient amount of Zn remains on the outer side of the refrigerant tube after brazing to provide a sacrificial anode effect.

When using the above method, however, a sufficient amount of liquid phase for bonding the bare fin material is not obtained if the amount of Si is inappropriate. Moreover, self-corrosion resistance decreases if an inappropriate element is added in addition to Si. The solidification structure formed by brazing has a primary crystal and a eutectic. Since the potential of the eutectic is lower than that of the primary crystal, preferential corrosion of the eutectic occurs so that the primary crystal that functions as a sacrificial anode material falls off at an early stage. As a result, corrosion resistance decreases.

JP-A-2004-225061, JP-A-2005-16937, JP-A-2005-307251, JP-A-2005-314719, JP-A-2007-178062, and JP-A-2008-303405 disclose related-art technologies.

SUMMARY OF THE INVENTION

The present invention was conceived as a result of conducting tests and studies on the relationship between the composition of the outer-side cladding material, the brazability of the outer-side cladding material and the bare fin material, and the sacrificial anode properties of the outer-side cladding material in order to solve the above problems to obtain outer-side brazability and outer-side corrosion resistance. An object of the present invention is to provide an aluminum alloy clad sheet for heat exchangers that exhibits excellent brazability and outer-side corrosion resistance, and is suitably used as a member (particularly a tube material or a tank or header material) of an aluminum alloy heat exchanger that is produced by inert-gas brazing using a fluoride flux.

According to one aspect of the present invention, there is provided an aluminum alloy clad sheet for heat exchangers comprising a core material, a cladding material 1, and a cladding material 2, one side and the other side of the core material being respectively clad with the cladding material 1 and the cladding material 2, the core material comprising 0.5 to 1.2% (mass %, hereinafter the same) of Si, 0.2 to 1.0% of Cu, 1.0 to 1.8% of Mn, and 0.05 to 0.3% of Ti, with the balance being Al and unavoidable impurities, the cladding material 1 comprising 3 to 6% of Si, 2 to 8% of Zn, and at least one of 0.3 to 1.8% of Mn and 0.05 to 0.3% of Ti, with the balance being Al and unavoidable impurities, and the cladding material 2 comprising 6 to 13% of Si, with the balance being Al and unavoidable impurities, the cladding material 1 serving as the outer side of the aluminum alloy clad sheet during use.

In the above aluminum alloy clad sheet, the core material may further comprise at least one of 0.3% or less of Cr and 0.3% or less of Zr.

In the above aluminum alloy clad sheet, the core material may further comprise 0.5% or less of Mg.

In the above aluminum alloy clad sheet, the cladding material 1 may further comprise 0.005 to 0.05% of Sr.

In the above aluminum alloy clad sheet, the cladding material 1 may further comprise at least one of 0.3% or less of Cr and 0.3% or less of Zr.

In the above aluminum alloy clad sheet, the cladding material 1 may further comprise at least one of 0.001 to 0.1% of In and 0.001 to 0.1% of Sn.

In the above aluminum alloy clad sheet, the cladding material 1 may have an Ni content of less than 0.05%.

In the above aluminum alloy clad sheet, the cladding material 2 may further comprise 0.005 to 0.05% of Sr.

In the above aluminum alloy clad sheet, the cladding material 2 may further comprise 0.1 to 0.5% of Cu.

According to another aspect of the present invention, there is provided an aluminum alloy clad sheet for heat exchangers comprising a core material and a cladding material 1, one side of the core material being clad with the cladding material 1, the core material comprising 0.5 to 1.2% of Si, 0.2 to 1.0% of Cu, 1.0 to 1.8% of Mn, and 0.05 to 0.3% of Ti, with the balance being Al and unavoidable impurities, and the cladding material 1 comprising 3 to 6% of Si, 2 to 8% of Zn, and at least one of 0.3 to 1.8% of Mn and 0.05 to 0.3% of Ti, with the balance being Al and unavoidable impurities, the cladding material 1 serving as the outer side of the aluminum alloy clad sheet during use.

In the above aluminum alloy clad sheet, the core material may further comprise at least one of 0.3% or less of Cr and 0.3% or less of Zr.

In the above aluminum alloy clad sheet, the core material may further comprise 0.5% or less of Mg.

In the above aluminum alloy clad sheet, the cladding material 1 may further comprise 0.005 to 0.05% of Sr.

In the above aluminum alloy clad sheet, the cladding material 1 may further comprise at least one of 0.3% or less of Cr and 0.3% or less of Zr.

In the above aluminum alloy clad sheet, the cladding material 1 may further comprise at least one of 0.001 to 0.1% of In and 0.001 to 0.1% of Sn.

In the above aluminum alloy clad sheet, the cladding material 1 may have an Ni content of less than 0.05%.

The present invention thus provides an aluminum alloy clad sheet for heat exchangers that exhibits excellent brazability and outer-side corrosion resistance, and is used as a member of an aluminum alloy heat exchanger that is produced by inert-gas brazing using a fluoride flux. The aluminum alloy clad sheet according to the present invention may be suitably used as a tube material or a tank or header material.

DESCRIPTION OF EXEMPLARY EMBODIMENTS

Figure 1:
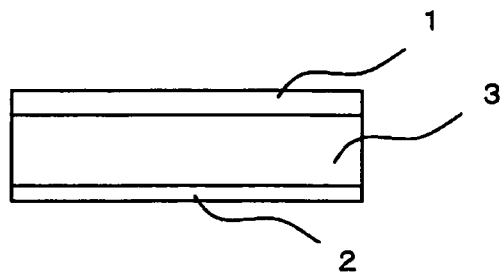
FIG. 1 is a schematic view showing a three-layered clad sheet according to the present invention.
Figure 3:
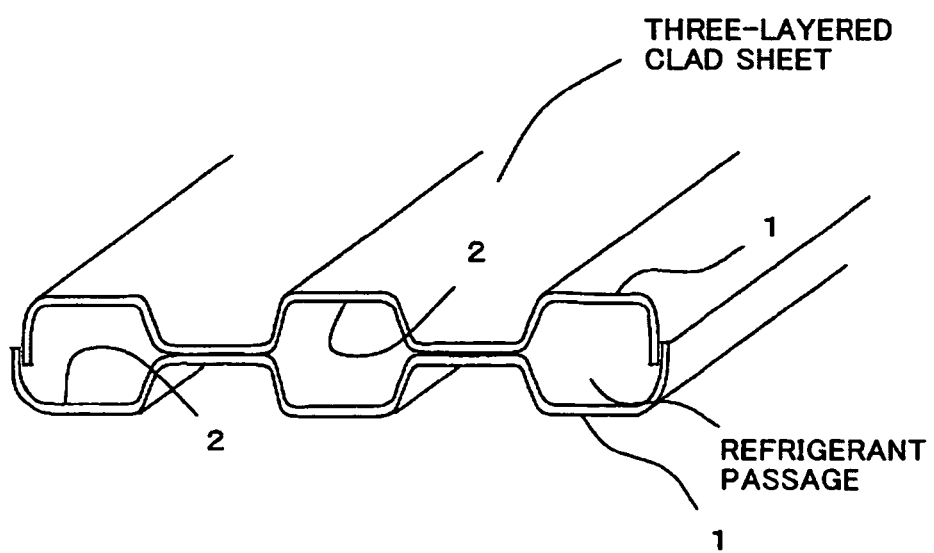
FIG. 3 is a schematic view showing a refrigerant tube formed using a three-layered clad sheet according to the present invention.

As shown in FIG. 1, a three-layered aluminum alloy clad sheet according to the present invention has a configuration in which one side of a core material 3 is clad with a cladding material 1, and the other side of the core material 3 is clad with a cladding material 2. As shown in FIG. 3, each clad sheet is formed so that the cladding material 1 forms a convex surface, and the cladding material 2 forms a concave surface. The clad sheets are assembled so that the concave surfaces face each other, and brazed to form a refrigerant tube. Therefore, the cladding material 1 comes in contact with air, and the cladding material 2 comes contact with a refrigerant during use so that heat is exchanged between the refrigerant and the air. A corrugated bare fin may be disposed in the refrigerant passage.

Figure 4:
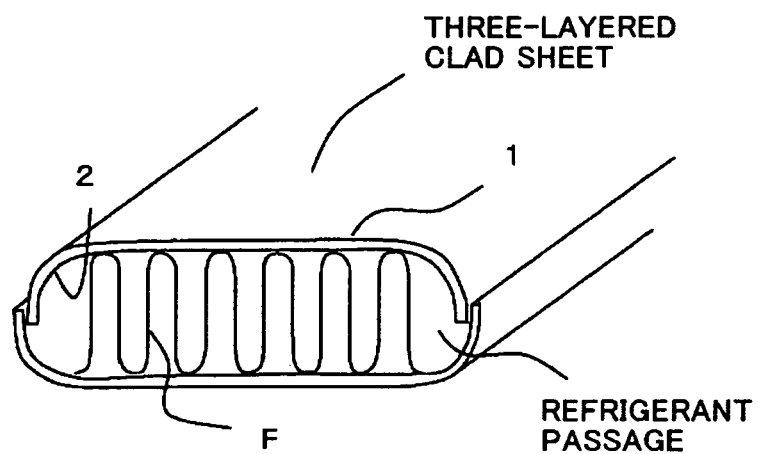
FIG. 4 is a schematic view showing another refrigerant tube formed using a three-layered clad sheet according to the present invention.

FIG. 4 shows another configuration of a refrigerant tube. Specifically, each clad sheet is formed so that the cladding material 1 forms a convex surface, and the cladding material 2 forms a concave surface. A bare fin F is corrugated and disposed to face the cladding material 2. The clad sheets are assembled so that the concave surfaces face each other, and brazed to form a refrigerant tube. The cladding material 1 comes in contact with air, and the cladding material 2 comes in contact with a refrigerant during use so that heat is exchanged between the refrigerant and the air.

Figure 2:
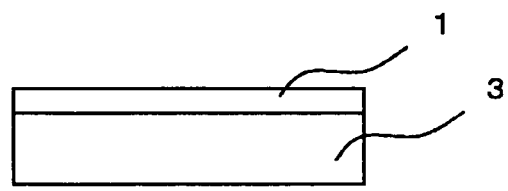
FIG. 2 is a schematic view showing a two-layered clad sheet according to the present invention.
Figure 5:
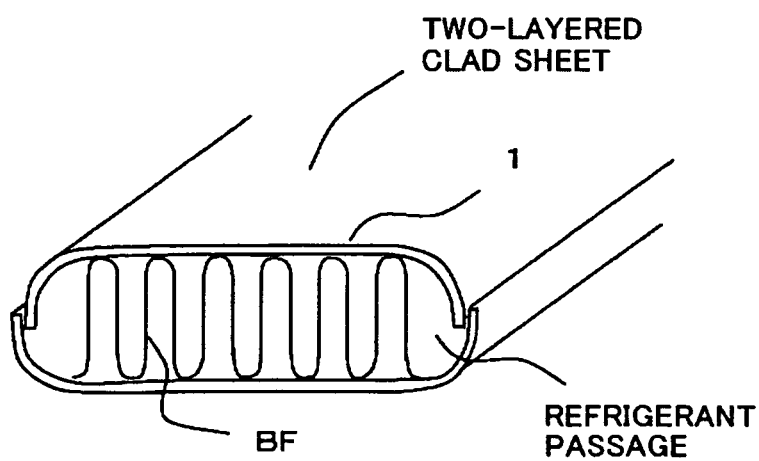
FIG. 5 is a schematic view showing a refrigerant tube formed using a two-layered clad sheet according to the present invention.

As shown in FIG. 2, a two-layered aluminum alloy clad sheet according to the present invention has a configuration in which one side of the core material is clad with the cladding material 1. As shown in FIG. 5, each clad sheet is formed so that the cladding material 1 forms a convex surface, and the core material forms a concave surface. A brazing fin BF of which each side is clad with a filler metal is corrugated and disposed to face the core material. The clad sheets are assembled so that the concave surfaces face each other, and brazed to form a refrigerant tube. In this case, the cladding material 1 and the core material can be brazed by disposing the cladding material 1 and the core material to overlap. The cladding material 1 comes in contact with air, and the core material comes in contact with a refrigerant during use so that heat is exchanged between the refrigerant and the air.

The effects of each alloy component of the aluminum alloy clad sheet according to the present invention, and the reasons for the limitation to the content range of each alloy component are described below.

(Core Material)

Si, Cu, and Mn:

The strength of the core material is improved by adding Si, Cu, and Mn to the core material. The Si content is preferably 0.5 to 1.2%, the Cu content is preferably 0.2 to 1.0%, and the Mn content is preferably 1.0 to 1.8%. If the Si content, the Cu content, or the Mn content is less than the lower limit, the strength of the core material may not be sufficiently improved. If the Si content or the Cu content exceeds the upper limit, the melting point of the core material may decrease. If the Mn content exceeds the upper limit, the rollability of the core material may decrease. The Si content is more preferably 0.65 to 1.1%, the Cu content is more preferably 0.2 to 0.7%, and the Mn content is more preferably 1.1 to 1.7%.

Cr and Zr:

The crystal grains of the core material are coarsened by adding Cr and Zr to the core material. This suppresses a situation in which a molten filler metal permeates the crystal grain boundaries during brazing so that erosion occurs. The Cr content is preferably 0.3% or less, and the Zr content is preferably 0.3% or less. If the Cr content or the Zr content exceeds 0.3%, coarse crystallized products may be produced during casting so that it may be difficult to produce a sound sheet material.

Ti:

The addition of Ti to the core material allows a high-Ti-concentration area and a low-Ti-concentration area to be distributed in layers in the core material along the thickness direction. Since the low-Ti-concentration area is preferentially corroded as compared with the high-Ti-concentration area, corrosion occurs in layers along the thickness direction. This suppresses the progress of corrosion in the thickness direction. The Ti content is preferably 0.05 to 0.3%. If the Ti content is less than 0.05%, the effect may be insufficient. If the Ti content exceeds 0.3%, coarse crystallized products may be produced during casting so that it may be difficult to produce a sound sheet material.

Mg:

The strength of the core material is improved by adding Mg to the core material. However, Mg diffuses from the core material to the filler metal during brazing, and reacts with a fluoride flux applied to the surface of the core material to form a compound having a high melting point. This decreases the activity of the flux so that brazability decreases. The Mg content is preferably 0.5% or less. If the Mg content exceeds 0.5%, the above phenomenon may occur to a large extent. The Mg content is more preferably 0.3% or less.

The core material normally contains about 0.1 to 0.2% of Fe as impurities. The Fe content may be reduced to less than 0.1% in order to improve the brazability of the core material. Alternatively, 1.0% or less of Fe may be added to the core material in order to improve the strength of the core material. The effects of the present invention are not impaired even if the core material contains 0.3% or less of V, Mo, or Ni, or 0.1% or less of Pb, Li, Ca, or Na. 0.1% or less of B may be added to the core material in order to prevent oxidation. 0.1% or less of Sr may also be added to the core material. Sr diffuses into a filler metal to promote refinement of the solidification structure of the filler metal.

Cladding Material 1 (Outer-Side Cladding Material)

Si:

Si contained in the cladding material 1 causes a small amount of liquid phase to be produced in the cladding material 1 during brazing so that a bare fin material can be bonded to the outer side of the clad sheet. On the other hand, most of the Si is not melted and remains on the surface of the cladding material 1. Si remains on the outer side of the clad sheet after brazing as a sacrificial anode layer that contains zinc so that the corrosion resistance of the clad sheet can be improved. The Si content is preferably 3 to 6%. If the Si content is less than 3%, a sufficient liquid phase may not be produced so that a sound fillet may not be formed at the joint with a bare fin material. If the Si content exceeds 6%, most of the cladding material 1 may be melted so that Zn contained in the cladding material 1 may also flow during brazing. As a result, the cladding material 1 may not function as a sacrificial anode material. The Si content is more preferably 3.5 to 5.5%.

Zn:

Zn contained in the cladding material 1 diffuses into the core material during brazing to form a Zn concentration gradient in the core material along the thickness direction. Therefore, the potential of the cladding material 1 becomes lower than that of the core material so that the cladding material 1 functions as a sacrificial anode material to suppress the progress of corrosion in the thickness direction. In the present invention, Si is added to the cladding material 1. Si increases the potential of the cladding material 1 upon dissolution to counterbalance the potential decreasing effect of Zn. Cu contained in the core material diffuses into the cladding material 1 during brazing. Cu also increases the potential of the cladding material 1 upon dissolution to counterbalance the potential decreasing effect of Zn. Since Zn is contained in the liquid phase that is produced due to Si, the amount of the remaining Zn decreases. The Zn content is preferably 2 to 8%. If the Zn content is less than 2%, a sufficient potential decreasing effect may not be obtained. If the Zn content exceeds 8%, a sufficient potential decreasing effect is obtained, but a fillet formed at a joint may be corroded at an early stage. The Zn content is more preferably 3 to 7%.

Mn:

In the present invention, part of Si contained in the cladding material 1 is melted during brazing to form a solidification structure. Therefore, the cladding material 1 (outer-side cladding material) contains a primary crystal a phase and a eutectic phase. Since the potential of the eutectic is lower than that of the primary crystal, the eutectic is preferentially corroded as compared with the primary crystal. If the eutectic is corroded, the primary crystal is isolated and falls off. If the primary crystal that has a sacrificial anode effect falls off, the sacrificial anode material disappears without exerting the sacrificial anode effect. Therefore, the core material is corroded at an early stage so that perforation corrosion occurs. In order to prevent the above phenomenon, it is necessary to coarsen the primary crystal so that the primary crystal does not fall off even if the eutectic is preferentially corroded, and form a low-potential area in the primary crystal. Since the primary crystal is coarsened by adding Mn to the outer-side cladding material, a situation in which the primary crystal falls off can be prevented. Moreover, an Al—Mn—Si compound is formed in the primary crystal, and an Mn/Si-deficient layer formed around the Al—Mn—Si compound serves as a low-potential area, so that preferential corrosion of the eutectic phase is relatively suppressed. The Mn content is preferably 0.3 to 1.8%. If the Mn content is less than 0.3%, the effect may be insufficient. If the Mn content exceeds 1.8%, the Si concentration in the outer-side cladding material may significantly decrease due to formation of an Al—Mn—Si compound so that the amount of liquid phase produced may decrease. The Mn content is more preferably 0.3 to 1.3%.

Ti:

Ti contained in the cladding material 1 coarsens the primary crystal in the same manner as Mn. This prevents a situation in which the primary crystal falls off. The Ti content is preferably 0.05 to 0.3%. If the Ti content is less than 0.05%, the effect is insufficient. If the Ti content exceeds 0.3%, coarse crystallized products are produced so that the bondability of the outer side may be impaired.

Sr:

The Si particles contained in the cladding material 1 are finely dispersed by adding Sr to the cladding material 1 so that liquid phases of a molten filler metal produced during brazing are easily bonded. Since the uniformity of the liquid phase is thus improved, a uniform molten state is obtained. As a result, the thickness of the outer filler metal layer that remains after brazing becomes uniform so that the corrosion resistance of the cladding material 1 is improved. If the Sr content is less than 0.005%, coarse Si particles are locally distributed so that the area that contains the coarse Si particles is significantly melted during brazing. As a result, the sacrificial layer may locally decrease or disappear so that the corrosion resistance of the cladding material 1 may decrease to a large extent. If the Sr content exceeds 0.05%, coarse Al—Si—Sr compounds may be produced so that the corrosion resistance of the cladding material 1 may decrease.

Cr and Zr:

The primary crystal is coarsened by adding Cr and Zr to the cladding material 1. This prevents a situation in which the primary crystal falls off. The Cr content is preferably 0.3% or less, and the Zr content is preferably 0.3% or less. If the Cr content or the Zr content exceeds 0.3%, coarse crystallized products may be produced so that the bondability of the outer side may be impaired.

In and Sn:

A potential decreasing effect is achieved by adding a small amount of In and Sn. Therefore, the potential of the outer-side cladding material becomes lower than that of the core material by adding In and Sn to the cladding material 1 so that a sacrificial anode effect can be obtained. The In content is preferably 0.001 to 0.1%, and the Sn content is preferably 0.001 to 0.1%. If the In content or the Sn content is less than 0.001%, the effect may be insufficient. If the In content or the Sn content exceeds 0.1%, the self-corrosion resistance of the cladding material 1 may decrease. The In content and the Sn content are more preferably 0.01 to 0.04%.

Ni:

An Al—Ni compound is formed when the cladding material 1 (outer-side cladding material) contains Ni, Since the Al—Ni compound functions as a cathode, the self-corrosion resistance of the outer-side cladding material (sacrificial anode material) decreases so that corrosion is promoted (i.e., perforation corrosion occurs at an early stage). The above phenomenon significantly occurs when the Ni content is 0.05% or more. Therefore, the Ni content is preferably less than 0.05%.

The cladding material 1 normally contains about 0.1 to 0.2% of Fe as impurities. The Fe content may be reduced to less than 0.1% in order to improve the brazability of the cladding material 1. Alternatively, 1.0% or less of Fe may be added to the cladding material 1 in order to improve the strength of the cladding material 1. The effects of the present invention are not impaired even if the cladding material 1 contains 0.3% or less of V or Mo, or 0.1% or less of Pb, Li, Ca, or Na.

Cladding Material 2 (Inner-Side Cladding Material)

Si:

When using the clad sheet according to the present invention as a refrigerant tube, it is necessary to form a refrigerant passage by assembling the formed clad sheets to face each other, or bonding the formed clad sheet to another member. When forming a refrigerant passage by assembling the formed clad sheets to face each other, or another member is not provided with a filler metal, it is necessary to apply a filler metal to the inner side of the clad sheet. Therefore, Si must be added to the cladding material 2 (inner-side cladding material) to obtain an Al—Si alloy filler metal. The Si content in the cladding material 2 is preferably 6 to 13%. If the Si content is less than 6%, the amount of filler metal melted may be insufficient (i.e., the filler metal may not exhibit a sufficient function). If the Si content exceeds 13%, an Si primary crystal may be produced so that it may be difficult to produce a sound clad sheet.

Sr:

The Si particles contained in the cladding material 2 are finely dispersed by adding Sr to the cladding material 2 (inner-side cladding material) so that liquid phases of a molten filler metal produced during brazing are easily bonded. As a result, the fluidity of the liquid phase is improved so that the cladding material 2 exhibits excellent brazability. The Sr content is preferably 0.005 to 0.05%. If the Sr content is less than 0.005%, the effect may be insufficient. If the Sr content exceeds 0.05%, coarse Al—Si—Sr compounds may be produced so that the effect may decrease.

Cu:

Zn that has a potential decreasing effect is concentrated at the joint between the cladding material 2 (inner-side cladding material) and the cladding material 1 (outer-side cladding material) so that the joint tends to be preferentially corroded. It is possible to counterbalance the potential decreasing effect of Zn by adding Cu that has a potential increasing effect to the cladding material 2 (inner-side cladding material) so that preferential corrosion of the joint can be suppressed. The Cu content is preferably 0.1 to 0.5%. If the Cu content is less than 0.1%, the effect may be insufficient. If the Cu content exceeds 0.5%, the joint may serve as a cathode due to an increase in potential to promote corrosion of the area around the joint. The Cu content is more preferably 0.2 to 0.4%.

The cladding material 2 normally contains about 0.1 to 0.2% of Fe as impurities. The Fe content may be reduced to less than 0.1% in order to improve the brazability of the cladding material 2. Alternatively, 1.0% or less of Fe may be added to the cladding material 1 in order to improve the strength of the cladding material 2. The effects of the present invention are not impaired even if the cladding material 2 contains 0.3% or less of V, Mo, or Ni, or 0.1% or less of Pb, Li, Ca, or Na. 0.3% or less of Ti may be added to the cladding material 2 in order to refine the cast structure. 0.1% or less of B may be added to the cladding material 2 in order to prevent oxidation.

EXAMPLES

The present invention is described below by way of examples and comparative examples. Note that the following examples merely illustrate several aspects of the present invention. The present invention is not limited to the following examples.

(Test A)

An aluminum alloy for the cladding material 1 (outer-side cladding material) having a composition shown in Table 1 or 2, an aluminum alloy for the core material shown in Table 3 or 4, and an aluminum alloy for the cladding material 2 (inner-side cladding material) having a composition shown in Table 5 or 6 were continuously cast, and homogenized by a normal method. The aluminum alloy for the cladding material 1 and the aluminum alloy for the cladding material 2 were then hot-rolled, and placed on the aluminum alloy for the core material according to the combination shown in Table 7 or 8 so that the thickness ratio of the cladding material 1, the core material, and the cladding material 2 was 20%/70%/10%. The aluminum alloys were then subjected to hot rolling, cold rolling, optional process annealing, and final annealing to obtain a three-layered clad sheet (temper: H14) having a thickness of 0.20 mm.

TABLE 1

| No. | Si | Zn | Mn | Ti | Sr | Cr | Zr | In | Sn | Ni | Al |
|---|---|---|---|---|---|---|---|---|---|---|---|
| A1 | 3 | 4 | 1 | | | | | | | | Balance |
| A2 | 6 | 4 | 1 | | | | | | | | Balance |
| A3 | 5 | 2 | 1 | | | | | | | | Balance |
| A4 | 5 | 8 | 1 | | | | | | | | Balance |
| A5 | 5 | 4 | 0.3 | | | | | | | | Balance |
| A6 | 5 | 4 | 1.8 | | | | | | | | Balance |
| A7 | 5 | 4 | | 0.05 | | | | | | | Balance |
| A8 | 5 | 4 | | 0.3 | | | | | | | Balance |
| A9 | 5 | 4 | 1 | 0.15 | | | | | | | Balance |
| A10 | 5 | 4 | 1 | | 0.005 | | | | | | Balance |
| A11 | 5 | 4 | 1 | | 0.05 | | | | | | Balance |
| A12 | 5 | 4 | 1 | | | 0.3 | | | | | Balance |
| A13 | 5 | 4 | 1 | 0.15 | | | 0.3 | | | | Balance |
| A14 | 5 | 4 | 1 | 0.15 | | | | 0.001 | | | Balance |
| A15 | 5 | 4 | | 0.15 | | | | 0.1 | | | Balance |
| A16 | 5 | 4 | | 0.15 | | | | | 0.001 | | Balance |
| A17 | 5 | 4 | | 0.15 | | | | | 0.1 | | Balance |
| A18 | 5 | 4 | | 0.15 | | | | | | 0.04 | Balance |
| A19 | 3.5 | 4 | 1 | 0.15 | | | | | | | Balance |
| A20 | 5.5 | 4 | 1 | 0.15 | | | | | | | Balance |
| A21 | 5 | 3 | 1 | | | | | | | | Balance |
| A22 | 5 | 7 | 1 | | | | | | | | Balance |
| A23 | 5 | 4 | 1.3 | | | | | | | | Balance |
| A24 | 5 | 4 | | 0.15 | | | | | 0.04 | | Balance |
| A25 | 5 | 4 | | 0.15 | | | | 0.04 | | | Balance |

TABLE 2

| No. | Si | Zn | Mn | Ti | Sr | Cr | Zr | In | Sn | Ni | Al |
|---|---|---|---|---|---|---|---|---|---|---|---|
| A26 | 2 | 4 | 1 | | | | | | | | Balance |
| A27 | 7 | 4 | 1 | | | | | | | | Balance |
| A28 | 5 | 1.5 | 1 | | | | | | | | Balance |
| A29 | 5 | 9 | 1 | | | | | | | | Balance |
| A30 | 5 | 4 | 0.2 | | | | | | | | Balance |
| A31 | 5 | 4 | 2 | | | | | | | | Balance |
| A32 | 5 | 4 | | 0.04 | | | | | | | Balance |
| A33 | 5 | 4 | 1 | 0.35 | | | | | | | Balance |
| A34 | 5 | 4 | 1 | | 0.005 | | | | | | Balance |
| A35 | 5 | 4 | 1 | | 0.07 | | | | | | Balance |
| A36 | 5 | 4 | 1 | | | 0.4 | | | | | Balance |
| A37 | 5 | 4 | 1 | 0.15 | | | 0.4 | | | | Balance |
| A38 | 5 | 4 | 1 | 0.15 | | | | 0.0005 | | | Balance |
| A39 | 5 | 4 | | 0.15 | | | | 0.15 | | | Balance |
| A40 | 5 | 4 | | 0.15 | | | | | 0.0005 | | Balance |
| A41 | 5 | 4 | | 0.15 | | | | | 0.15 | | Balance |
| A42 | 5 | 4 | | 0.15 | | | | | | 0.06 | Balance |

TABLE 3

| No. | Si | Cu | Mn | Ti | Cr | Zr | Mg | Al |
|---|---|---|---|---|---|---|---|---|
| C1 | 0.5 | 0.6 | 1.3 | 0.15 | | | | Balance |
| C2 | 1.2 | 0.6 | 1.3 | 0.15 | | | | Balance |
| C3 | 0.8 | 0.2 | 1.3 | 0.15 | | | | Balance |
| C4 | 0.8 | 1 | 1.3 | 0.15 | | | | Balance |
| C5 | 0.8 | 0.6 | 1 | 0.15 | | | | Balance |
| C6 | 0.8 | 0.6 | 1.8 | 0.15 | | | | Balance |
| C7 | 0.8 | 0.6 | 1.3 | 0.05 | | | | Balance |
| C8 | 0.8 | 0.6 | 1.3 | 0.3 | | | | Balance |
| C9 | 0.8 | 0.6 | 1.3 | 0.15 | 0.3 | | | Balance |
| C10 | 0.8 | 0.6 | 1.3 | 0.15 | | 0.3 | | Balance |
| C11 | 0.8 | 0.6 | 1.3 | 0.15 | | | 0.5 | Balance |
| C12 | 0.8 | 0.6 | 1.3 | 0.15 | | | | Balance |
| C13 | 0.8 | 0.6 | 1.3 | 0.15 | | | | Balance |
| C14 | 0.9 | 0.6 | 1.6 | 0.15 | | | | Balance |
| C15 | 0.65 | 0.6 | 1.3 | 0.15 | | | | Balance |
| C16 | 1.1 | 0.6 | 1.3 | 0.15 | | | | Balance |
| C17 | 0.8 | 0.2 | 1.3 | 0.15 | | | | Balance |
| C18 | 0.8 | 0.9 | 1.3 | 0.15 | | | | Balance |
| C19 | 0.8 | 0.6 | 1.1 | 0.15 | | | | Balance |
| C20 | 0.8 | 0.6 | 1.7 | 0.15 | | | | Balance |
| C21 | 0.8 | 0.6 | 1.3 | 0.15 | | | 0.3 | Balance |
| C22 | 0.8 | 0.6 | 1.3 | 0.15 | | | | Balance |

TABLE 4

| No. | Si | Cu | Mn | Ti | Cr | Zr | Mg | Al |
|---|---|---|---|---|---|---|---|---|
| C23 | 0.4 | 0.6 | 1.3 | 0.15 | | | | Balance |
| C24 | 1.3 | 0.6 | 1.3 | 0.15 | | | | Balance |
| C25 | 0.8 | 0.1 | 1.3 | 0.15 | | | | Balance |
| C26 | 0.8 | 1.1 | 1.3 | 0.15 | | | | Balance |
| C27 | 0.8 | 0.6 | 0.9 | 0.15 | | | | Balance |
| C28 | 0.8 | 0.6 | 1.9 | 0.15 | | | | Balance |
| C29 | 0.8 | 0.6 | 1.3 | 0.02 | | | | Balance |
| C30 | 0.8 | 0.6 | 1.3 | 0.4 | | | | Balance |
| C31 | 0.8 | 0.6 | 1.3 | 0.15 | 0.4 | | | Balance |
| C32 | 0.8 | 0.6 | 1.3 | 0.15 | | 0.4 | | Balance |
| C33 | 0.8 | 0.6 | 1.3 | 0.15 | | | 0.6 | Balance |

TABLE 5

| No. | Si | Sr | Cu | Al |
|---|---|---|---|---|
| B1 | 6 | | | Balance |
| B2 | 13 | | | Balance |
| B3 | 10 | 0.005 | | Balance |
| B4 | 10 | 0.05 | | Balance |
| B5 | 10 | | 0.1 | Balance |
| B6 | 10 | | 0.5 | Balance |
| B7 | 10 | | | Balance |
| B8 | 9 | | | Balance |
| B9 | 9 | | 0.2 | Balance |
| B10 | 7.5 | | 0.4 | Balance |

TABLE 6

| No. | Si | Sr | Cu | Al |
|---|---|---|---|---|
| B11 | 5 | | | Balance |
| B12 | 14 | | | Balance |
| B13 | 10 | 0.06 | | Balance |
| B14 | 10 | | 0.6 | Balance |

TABLE 7

| Specimen No. | Cladding material 1 | Core material | Cladding material 2 |
|---|---|---|---|
| 1 | A1 | C1 | B1 |
| 2 | A2 | C2 | B2 |
| 3 | A3 | C3 | B3 |
| 4 | A4 | C4 | B4 |
| 5 | A5 | C5 | B5 |
| 6 | A5 | C6 | B6 |
| 7 | A7 | C7 | B7 |
| 8 | A8 | C8 | B8 |
| 9 | A9 | C9 | B9 |
| 10 | A10 | C10 | B10 |
| 11 | A11 | C11 | B1 |
| 12 | A12 | C12 | B2 |
| 13 | A13 | C13 | B3 |
| 14 | A14 | C14 | B4 |
| 15 | A15 | C15 | B5 |
| 16 | A16 | C16 | B6 |
| 17 | A17 | C17 | B7 |
| 18 | A18 | C18 | B8 |
| 19 | A19 | C19 | B9 |
| 20 | A20 | C20 | B10 |
| 21 | A21 | C21 | B1 |
| 22 | A22 | C22 | B2 |
| 23 | A23 | C1 | B3 |

TABLE 7-continued

| Specimen No. | Cladding material 1 | Core material | Cladding material 2 |
|---|---|---|---|
| 24 | A24 | C2 | B4 |
| 25 | A25 | C3 | B5 |

TABLE 8

| Specimen No. | Cladding material 1 | Core material | Cladding material 2 |
|---|---|---|---|
| 26 | A26 | C23 | B7 |
| 27 | A27 | C13 | B7 |
| 28 | A28 | C25 | B7 |
| 29 | A29 | C13 | B7 |
| 30 | A30 | C27 | B7 |
| 31 | A31 | C13 | B7 |
| 32 | A32 | C13 | B7 |
| 33 | A33 | C13 | B7 |
| 34 | A34 | C24 | B7 |
| 35 | A35 | C26 | B7 |
| 36 | A36 | C27 | B7 |
| 37 | A38 | C29 | B7 |
| 38 | A37 | C30 | B7 |
| 39 | A39 | C13 | B13 |
| 40 | A40 | C13 | B11 |
| 41 | A41 | C13 | B7 |
| 42 | A42 | C13 | B7 |
| 43 | A10 | C31 | B7 |
| 44 | A10 | C32 | B7 |
| 45 | A10 | C33 | B7 |
| 46 | A10 | C13 | B14 |

The resulting three-layered clad sheet (specimen) was subjected to the following tests 1 to 4.

Test 1:

The clad sheet was cut to dimensions of 100×250 mm. About 5 g/m² of a fluoride flux was applied to each side of the clad sheet, and then dried. The clad sheet was then brazed by heating the clad sheet to 600° C. in a nitrogen gas atmosphere at an average temperature increase rate of 50° C./min. The clad sheet was then processed into a JIS Z 2201 No. 5 specimen, and subjected to a tensile test at room temperature in accordance with JIS Z 2241. A case where the tensile strength of the specimen was 120 MPa or more was evaluated as "Good", and a case where the tensile strength of the specimen was less than 120 MPa was evaluated as "Bad".

Figure 8:
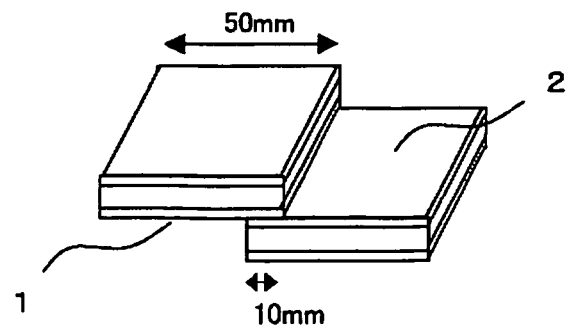
FIG. 8 is a view showing the state of a specimen used for a corrosion test before brazing.

Test 2:

The clad sheet was cut to dimensions of 50×50 mm. The clad sheets thus obtained were held using a jig so that the cladding material 1 and the cladding material 2 overlapped by 10 mm (see FIG. 8). About 5 g/m² of a fluoride flux was applied to each side of the clad sheet, and then dried. The clad sheet was then brazed by heating the clad sheet to 600° C. in a nitrogen gas atmosphere at an average temperature increase rate of 50° C./min. After masking the cladding material 2 (including the end face), the product was subjected to a SWAAT test (ASTM-G85-A3). The SWAAT test was performed for 12 weeks. A case where perforation corrosion from the cladding material 1 was not observed was evaluated as "Good", and a case where perforation corrosion from the cladding material 1 was observed was evaluated as "Bad". A case where separation due to corrosion did not occur at the joint when 8 weeks had elapsed was evaluated as "Good", and a case where separation due to corrosion occurred at the joint when 8 weeks had elapsed was evaluated as "Bad".

Figure 6:
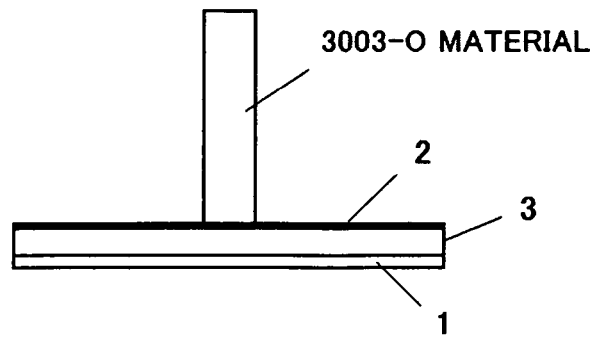
FIG. 6 is a view showing the state of an inverted T-shaped test specimen used for a brazing test before brazing.
Figure 7:
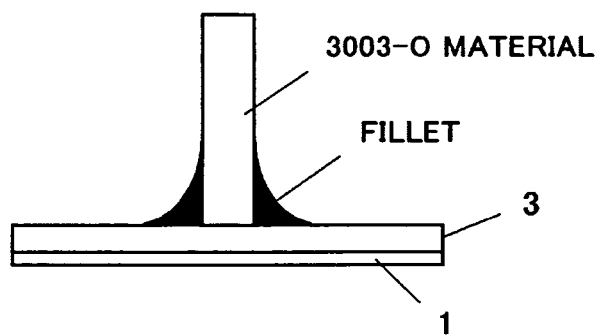
FIG. 7 is a view showing the state of an inverted T-shaped test specimen used for a brazing test after brazing.

Test 3:

The clad sheet was cut to dimensions of 25×50 mm, and then subjected to an inverted T-shaped test (horizontal sheet:

cladding material 2, vertical sheet: 3003-0 material (25×50×1.0 mm)) (see FIG. 6). The bonded specimen (see FIG. 7) was buried in a resin, and the cross-sectional area of a fillet formed on the bonding surface with the vertical sheet was measured. The ratio of the cross-sectional area of the fillet after brazing to the cross-sectional area of the cladding material 2 before brazing was calculated, and taken as the flow coefficient determined by the inverted T-shaped test. A case where the flow coefficient was 0.3 or more was evaluated as "Good", and a case where the flow coefficient was less than 0.3 was evaluated as "Bad".

Test 4:

The clad sheet was cut to dimensions of 25×100 mm. The clad sheets thus obtained were placed one on top of the other so that the cladding material 1 was positioned on the side that was bonded to a corrugated bare fin material, and held using a jig so that the fin height was 10 mm and the fin pitch was 40 mm. About 5 g/m$^2$ of a fluoride flux was sprayed onto the clad sheet, and then dried. The clad sheet was then brazed by heating the clad sheet to 600° C. in a nitrogen gas atmosphere at an average temperature increase rate of 50° C./min. As the fin material, an AA3203 alloy fin material (1.5% of Zn was added, thickness: 0.07 mm, temper: H14) was used. The specimen that was bonded in the shape of a mini-core was buried in a resin, and the cross-sectional area of a fillet formed on the bonding surface with the fin was measured. The ratio of the cross-sectional area of the fillet after brazing to the cross-sectional area of the cladding material 1 before brazing was calculated, and taken as the flow coefficient determined by the mini-core test. A case where the flow coefficient was 0.05 or more was evaluated as "Good", and a case where the flow coefficient was less than 0.05 was evaluated as "Bad".

The results of the tests 1 to 4 are shown in Tables 9 and 10. As shown in Table 9, the specimens 1 to 25 according to the present invention had a tensile strength of 120 MPa or more after brazing, a flow coefficient determined by the inverted T-shaped test of 0.3 or more, and a flow coefficient determined by the mini-core test of 0.05 or more. Specifically, the specimens 1 to 25 exhibited excellent strength after brazing and excellent brazability. The specimens 1 to 25 did not show perforation corrosion when subjected to the SWAAT test for 12 weeks, and did not show separation at the joint when subjected to the SWAAT test for 8 weeks. Specifically, the specimens 1 to 25 exhibited excellent outer-side corrosion resistance.

TABLE 9

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 1 | Good | Good | Good | Good | Good | Good |
| 2 | Good | Good | Good | Good | Good | Good |
| 3 | Good | Good | Good | Good | Good | Good |
| 4 | Good | Good | Good | Good | Good | Good |
| 5 | Good | Good | Good | Good | Good | Good |
| 6 | Good | Good | Good | Good | Good | Good |
| 7 | Good | Good | Good | Good | Good | Good |
| 8 | Good | Good | Good | Good | Good | Good |
| 9 | Good | Good | Good | Good | Good | Good |
| 10 | Good | Good | Good | Good | Good | Good |
| 11 | Good | Good | Good | Good | Good | Good |
| 12 | Good | Good | Good | Good | Good | Good |
| 13 | Good | Good | Good | Good | Good | Good |
| 14 | Good | Good | Good | Good | Good | Good |
| 15 | Good | Good | Good | Good | Good | Good |
| 16 | Good | Good | Good | Good | Good | Good |
| 17 | Good | Good | Good | Good | Good | Good |
| 18 | Good | Good | Good | Good | Good | Good |
| 19 | Good | Good | Good | Good | Good | Good |
| 20 | Good | Good | Good | Good | Good | Good |
| 21 | Good | Good | Good | Good | Good | Good |
| 22 | Good | Good | Good | Good | Good | Good |
| 23 | Good | Good | Good | Good | Good | Good |
| 24 | Good | Good | Good | Good | Good | Good |
| 25 | Good | Good | Good | Good | Good | Good |

TABLE 10

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 26 | Bad | Good | Bad | Good | Good | Good |
| 27 | Good | Good | Good | Bad | Good | Good |
| 28 | Bad | Good | Good | Bad | Good | Good |
| 29 | Good | Good | Good | Good | Bad | Good |
| 30 | Bad | Good | Good | Bad | Good | Good |
| 31 | Good | Good | Bad | Good | Good | Good |
| 32 | Good | Good | Good | Bad | Good | Good |
| 33 | Good | Good | Bad | Good | Good | Good |
| 34 | Good | Good | Good | Bad | Good | Good |

TABLE 10-continued

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 35 | Good | Good | Good | Bad | Good | Good |
| 36 | — | — | — | — | — | Bad |
| 37 | Good | Good | Good | Good | Bad | Good |
| 38 | — | — | — | — | — | Bad |
| 39 | Good | Good | Good | Good | Bad | Good |
| 40 | Good | Bad | Good | Good | Good | Good |
| 41 | Good | Good | Good | Good | Bad | Good |
| 42 | Good | Good | Good | Bad | Good | Good |
| 43 | — | — | — | — | — | Bad |
| 44 | — | — | — | — | — | Bad |
| 45 | — | — | — | — | — | Bad |
| 46 | Good | Good | Good | Bad | Good | Good |

As shown in Table 10, the specimen 26 had a flow coefficient determined by the mini-core test of less than 0.05 due to a low Si content in the cladding material 1, and a tensile strength of less than 120 MPa due to a low Si content in the core material. The specimen 27 did not exhibit sufficient corrosion resistance since the alloy components of the cladding material 1 containing Zn flowed to another area due to a high Si content in the cladding material 1. As a result, perforation corrosion occurred when the specimen 27 was subjected to the SWAAT test for 12 weeks. The specimen 28 did not exhibit sufficient corrosion resistance due to a low Zn content in the cladding material 1. As a result, perforation corrosion occurred when the specimen 28 was subjected to the SWAAT test for 12 weeks. The specimen 28 had a tensile strength of less than 120 MPa due to a low Cu content in the core material. The specimen 29 showed a phenomenon in which Zn was concentrated in the fillet due to a high Zn content in the cladding material 1. As a result, separation occurred at the joint when the specimen 29 was subjected to the SWAAT test for 8 weeks. The specimen 30 showed a phenomenon in which the size of the primary crystal formed in the cladding material 1 decreased due to a low Mn content in the cladding material 1. As a result, perforation corrosion occurred when the specimen 30 was subjected to the SWAAT test for 12 weeks. The specimen 30 had a tensile strength of less than 120 MPa due to a low Mn content in the core material. The specimen 31 had a flow coefficient determined by the mini-core test of less than 0.05 (i.e., a sufficient fillet was not formed at the fin joint) due to a high Mn content in the cladding material 1.

The specimen 32 showed a phenomenon in which the size of the primary crystal formed in the cladding material 1 decreased due to a low Ti content in the cladding material 1. As a result, perforation corrosion occurred when the specimen 32 was subjected to the SWAAT test for 12 weeks. The specimen 31 had a flow coefficient determined by the mini-core test of less than 0.05 (i.e., a sufficient fillet was not formed at the fin joint) due to a high Ti content in the cladding material 1. The specimen 34 showed local melting due to a high Si content in the core material. As a result, perforation corrosion occurred when the specimen 34 was subjected to the SWAAT test for 12 weeks. The specimen 35 showed local melting due to a high Cu content in the core material. As a result, perforation corrosion occurred when the specimen 35 was subjected to the SWAAT test for 12 weeks. The specimen 36 showed significant edge cracking during rolling due to a high Cr content in the cladding material 1 and a high Mn content in the core material (i.e., a clad sheet could not be produced). Perforation corrosion occurred in the specimen 37 when subjected to the SWAAT test for 12 weeks due to a low Ti content in the core material. The specimen 38 showed significant edge cracking during rolling due to a high Zr content in the cladding material 1 and a high Ti content in the core material (i.e., a clad sheet could not be produced). The specimen 39 showed significant corrosion in the overlapping area due to a high In content in the cladding material 1. As a result, separation occurred when the specimen 39 was subjected to the SWAAT test for 8 weeks. Moreover, refinement of the Si particles in the cladding material 2 was not observed after brazing due to a high Sr content in the cladding material 2.

The specimen 40 exhibited corrosion resistance when subjected to the SWAAT test due to an appropriate Zn content although the Sn content in the cladding material 1 was low. However, the specimen 40 had a flow coefficient determined by the inverted T-shaped test of less than 0.3 due to a low Si content in the cladding material 2. The specimen 41 showed significant corrosion in the overlapping area due to a high Sn content in the cladding material 1. As a result, separation occurred when the specimen 41 was subjected to the SWAAT test for 8 weeks. The specimen 42 showed rapid corrosion in the cladding material 1 due to a high Ni content in the cladding material 1. As a result, perforation corrosion occurred when the specimen 42 was subjected to the SWAAT test for 12 weeks. The specimen 43 showed significant edge cracking during rolling due to a high Zr content in the core material (i.e., a clad sheet could not be produced). The specimen 44 showed significant edge cracking during rolling due to a high Zr content in the core material (i.e., a clad sheet could not be produced). The specimen 45 did not allow overlap brazing due to a high Mg content in the core material (i.e., the SWAAT test could not be performed). The specimen 46 showed an increase in potential of the fillet due to a high Cu content in the cladding material 2. As a result, the sacrificial anode material around the fillet was corroded at an early stage of the SWAAT test, and perforation corrosion occurred when the specimen 46 was subjected to the SWAAT test for 12 weeks.

(Test B)

An aluminum alloy for the cladding material 1 shown in Table 1 or 2 and an aluminum alloy for the core material shown in Table 3 or 4 were continuously cast, and homogenized by a normal method. The aluminum alloy for the cladding material 1 was then hot-rolled, and placed on the aluminum alloy for the core material according to the combination shown in Table 11 or 12 so that the thickness ratio of the cladding material 1 and the core material was 20%/80%. The aluminum alloys were then subjected to hot rolling, cold rolling, optional process annealing, and final annealing to obtain a two-layered clad sheet (temper: H14) having a thickness of 0.20 mm. The resulting two-layered clad sheet was subjected to the following tests 1 to 3.

TABLE 11

| Specimen No. | Cladding material 1 | Core material |
|---|---|---|
| 47 | A1 | C1 |
| 48 | A2 | C2 |
| 49 | A3 | C3 |
| 50 | A4 | C4 |
| 51 | A5 | C5 |
| 52 | A6 | C6 |
| 53 | A7 | C7 |
| 54 | A8 | C8 |
| 55 | A9 | C9 |
| 56 | A10 | C10 |
| 57 | A11 | C11 |
| 58 | A12 | C12 |
| 59 | A13 | C13 |
| 60 | A14 | C14 |
| 61 | A15 | C15 |
| 62 | A16 | C16 |
| 63 | A17 | C17 |
| 64 | A18 | C18 |
| 65 | A19 | C19 |
| 66 | A20 | C20 |
| 67 | A21 | C21 |
| 68 | A22 | C22 |
| 69 | A23 | C1 |
| 70 | A24 | C2 |
| 71 | A25 | C3 |

TABLE 12

| Specimen No. | Cladding material 1 | Core material |
|---|---|---|
| 72 | A26 | C23 |
| 73 | A27 | C13 |
| 74 | A28 | C25 |
| 75 | A29 | C13 |
| 76 | A30 | C27 |
| 77 | A31 | C13 |
| 78 | A32 | C13 |
| 79 | A33 | C13 |
| 80 | A34 | C24 |
| 81 | A35 | C26 |
| 82 | A36 | C27 |
| 83 | A37 | C29 |
| 84 | A38 | C30 |
| 85 | A39 | C13 |
| 86 | A40 | C13 |
| 87 | A41 | C13 |
| 88 | A42 | C13 |
| 89 | A10 | C31 |
| 90 | A10 | C132 |
| 91 | A10 | C33 |

Test 1:

The clad sheet was cut to dimensions of 100×250 mm. About 5 g/m$^2$ of a fluoride flux was applied to each side of the clad sheet, and then dried. The clad sheet was then brazed by heating the clad sheet to 600° C. in a nitrogen gas atmosphere at an average temperature increase rate of 50° C./min. The clad sheet was then processed into a JIS Z 2201 No. 5 specimen, and subjected to a tensile test at room temperature in accordance with JIS Z 2241. A case where the tensile strength of the specimen was 120 MPa or more was evaluated as "Good", and a case where the tensile strength of the specimen was less than 120 MPa was evaluated as "Bad".

Test 2:

The clad sheet was cut to dimensions of 50×50 mm. The clad sheets thus obtained were held using a jig so that the cladding material 1 and the cladding material 2 overlapped by 10 mm (see FIG. 8). About 5 g/m$^2$ of a fluoride flux was applied to each side of the clad sheet, and then dried. The clad sheet was then brazed by heating the clad sheet to 600° C. in a nitrogen gas atmosphere at an average temperature increase rate of 50° C./min. After masking the cladding material 2 (including the end face), the product was subjected to a SWAAT test (ASTM-G85-A3). The SWAAT test was performed for 12 weeks. A case where perforation corrosion from the cladding material 1 was not observed was evaluated as "Good", and a case where perforation corrosion from the cladding material 1 was observed was evaluated as "Bad". A case where separation due to corrosion did not occur at the joint when 8 weeks had elapsed was evaluated as "Good", and a case where separation due to corrosion occurred at the joint when 8 weeks had elapsed was evaluated as "Bad".

Test 3:

The clad sheet was cut to dimensions of 25×100 mm. The clad sheets thus obtained were placed one on top of the other so that the cladding material 1 was positioned on the side that was bonded to a corrugated bare fin material, and held using a jig so that the fin height was 10 mm and the fin pitch was 40 mm. About 5 g/m$^2$ of a fluoride flux was sprayed onto the clad sheet, and then dried. The clad sheet was then brazed by heating the clad sheet to 600° C. in a nitrogen gas atmosphere at an average temperature increase rate of 50° C./min. As the fin material, an AA3203 alloy fin material (1.5% of Zn was added, thickness: 0.07 mm, temper: H14) was used. The specimen that was bonded in the shape of a mini-core was buried in a resin, and the cross-sectional area of a fillet formed on the bonding surface with the fin was measured. The ratio of the cross-sectional area of the fillet after brazing to the cross-sectional area of the cladding material 1 before brazing was calculated, and taken as the flow coefficient determined by the mini-core test. A case where the flow coefficient was 0.05 or more was evaluated as "Good", and a case where the flow coefficient was less than 0.05 was evaluated as "Bad".

The results of the tests 1 to 3 are shown in Tables 13 and 14. As shown in Table 13, the specimens 47 to 71 according to the present invention had a tensile strength of 120 MPa or more after brazing and a flow coefficient determined by the mini-core test of 0.05 or more. Specifically, the specimens 47 to 71 exhibited excellent strength after brazing and excellent brazability. The specimens 47 to 71 did not show perforation corrosion when subjected to the SWAAT test for 12 weeks, and did not show separation of the fin when subjected to the SWAAT test for 4 weeks. Specifically, the specimens 47 to 71 exhibited excellent outer-side corrosion resistance.

TABLE 13

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 47 | Good | Good | Good | Good | Good | Good |
| 48 | Good | Good | Good | Good | Good | Good |
| 49 | Good | Good | Good | Good | Good | Good |

TABLE 13-continued

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 50 | Good | Good | Good | Good | Good | Good |
| 51 | Good | Good | Good | Good | Good | Good |
| 52 | Good | Good | Good | Good | Good | Good |
| 53 | Good | Good | Good | Good | Good | Good |
| 54 | Good | Good | Good | Good | Good | Good |
| 55 | Good | Good | Good | Good | Good | Good |
| 56 | Good | Good | Good | Good | Good | Good |
| 57 | Good | Good | Good | Good | Good | Good |
| 58 | Good | Good | Good | Good | Good | Good |
| 59 | Good | Good | Good | Good | Good | Good |
| 60 | Good | Good | Good | Good | Good | Good |
| 61 | Good | Good | Good | Good | Good | Good |
| 62 | Good | Good | Good | Good | Good | Good |
| 63 | Good | Good | Good | Good | Good | Good |
| 64 | Good | Good | Good | Good | Good | Good |
| 65 | Good | Good | Good | Good | Good | Good |
| 66 | Good | Good | Good | Good | Good | Good |
| 67 | Good | Good | Good | Good | Good | Good |
| 68 | Good | Good | Good | Good | Good | Good |
| 69 | Good | Good | Good | Good | Good | Good |
| 70 | Good | Good | Good | Good | Good | Good |
| 71 | Good | Good | Good | Good | Good | Good |

TABLE 14

| Specimen No. | Tensile strength (≥120 MPa) | Inverted T-shaped test (flow coefficient ≥ 0.3) | Mini-core test (flow coefficient ≥ 0.05) | Perforation corrosion when subjected to SWAAT test for 12 weeks | Separation at joint when subjected to SWAAT test for 8 weeks | Production of specimen |
|---|---|---|---|---|---|---|
| 72 | Bad | Good | Bad | Good | Good | Good |
| 73 | Good | Good | Good | Bad | Good | Good |
| 74 | Bad | Good | Good | Bad | Good | Good |
| 75 | Good | Good | Good | Good | Bad | Good |
| 76 | Bad | Good | Good | Bad | Good | Good |
| 77 | Good | Good | Bad | Good | Good | Good |
| 78 | Good | Good | Good | Bad | Good | Good |
| 79 | Good | Good | Bad | Good | Good | Good |
| 80 | Good | Good | Good | Bad | Good | Good |
| 81 | Good | Good | Good | Bad | Good | Good |
| 82 | — | — | — | — | — | Bad |
| 83 | Good | Good | Good | Good | Bad | Good |
| 84 | — | — | — | — | — | Bad |
| 85 | Good | Good | Good | Good | Bad | Good |
| 86 | Good | Bad | Good | Good | Good | Good |
| 87 | Good | Good | Good | Good | Bad | Good |
| 88 | Good | Good | Good | Bad | Good | Good |
| 89 | — | — | — | — | — | Bad |
| 90 | — | — | — | — | — | Bad |
| 91 | — | — | — | — | — | Bad |

As shown in Table 14, the specimen 72 had a flow coefficient determined by the mini-core test of less than 0.05 due to a low Si content in the cladding material 1. The specimen 72 had a tensile strength of less than 120 MPa due to a low Si content in the core material. The specimen 73 did not exhibit sufficient corrosion resistance since the alloy components of the cladding material 1 containing Zn flowed to another area due to a high Si content in the cladding material 1. As a result, perforation corrosion occurred when the specimen 27 was subjected to the SWAAT test for 12 weeks. The specimen 74 did not exhibit sufficient corrosion resistance due to a low Zn content in the cladding material 1. As a result, perforation corrosion occurred when the specimen 74 was subjected to the SWAAT test for 12 weeks. The specimen 74 had a tensile strength of less than 120 MPa due to a low Cu content in the core material. The specimen 75 showed a phenomenon in which Zn was concentrated in the fillet due to a high Zn content in the cladding material 1. As a result, separation occurred at the joint when the specimen 75 was subjected to the SWAAT test for 8 weeks. The specimen 76 showed a phenomenon in which the size of the primary crystal formed in the cladding material 1 decreased due to a low Mn content in the cladding material 1. As a result, perforation corrosion occurred when the specimen 76 was subjected to the SWAAT test for 12 weeks. The specimen 76 had a tensile strength of less than 120 MPa due to a low Mn content in the core material. The specimen 77 had a flow coefficient determined by the mini-core test of less than 0.05 (i.e., a sufficient fillet was not formed at the fin joint) due to a high Mn content in the cladding material 1. The specimen 78 showed a phenomenon in which the size of the primary crystal formed in the cladding material 1 decreased due to a low Ti content in the cladding material 1. As a result, perforation corrosion occurred when the specimen 78 was subjected to the SWAAT test for 12 weeks. The specimen 79 had a flow coefficient determined by the mini-core test of less than 0.05 (i.e., a sufficient fillet was not formed at the fin joint) due to a high Ti content in the cladding material 1. The specimen 80 showed local melting due to a high Si content in the core material. As a result, perforation corrosion occurred when the specimen 80 was subjected to the SWAAT test for 12 weeks.

The specimen 81 showed local melting due to a high Cu content in the core material. As a result, perforation corrosion occurred when the specimen 81 was subjected to the SWAAT test for 12 weeks. The specimen 82 showed significant edge cracking due to a high Cr content in the cladding material 1 and a high Mn content in the core material (i.e., a clad sheet could not be produced). Perforation corrosion occurred in the specimen 83 when subjected to the SWAAT test for 12 weeks due to a low Ti content in the core material. The specimen 84 showed significant edge cracking due to a high Zr content in the cladding material 1 and a high Ti content in the core material (i.e., a clad sheet could not be produced). The specimen 85 showed significant corrosion in the overlapping area due to a high In content in the cladding material 1. As a result, separation occurred when the specimen 85 was subjected to the SWAAT test for 8 weeks. Moreover, refinement of the Si particles in the cladding material 2 was not observed after brazing due to a high Sr content in the cladding material 2. The specimen 86 exhibited corrosion resistance when subjected to the SWAAT test due to an appropriate Zn content although the Sn content in the cladding material 1 was low. However, the specimen 86 had a flow coefficient determined by the inverted T-shaped test of less than 0.3 due to a low Si content in the cladding material 2. The specimen 87 showed significant corrosion in the overlapping area due to a high Sn content in the cladding material 1. As a result, separation occurred when the specimen 87 was subjected to the SWAAT test for 8 weeks. The specimen 88 showed rapid corrosion in the cladding material 1 due to a high Ni content in the cladding material 1. As a result, perforation corrosion occurred when the specimen 88 was subjected to the SWAAT test for 12 weeks. The specimen 89 showed significant edge cracking due to a high Cr content in the core material (i.e., a clad sheet could not be produced). The specimen 90 showed significant edge cracking due to a high Zr content in the core material (i.e., a clad sheet could not be produced). The specimen 91 did not allow overlap brazing due to a high Mg content in the core material (i.e., the SWAAT test could not be performed).

Obviously, numerous modifications and variations of the present invention are possible in the light of the above teachings. It is therefore to be understood that within the scope of the appended claims, the invention may be practised otherwise than as specifically described herein.

What is claimed is:

1. An aluminum alloy clad sheet for a tube material of a heat exchanger, comprising a core material, a first cladding material provided on a first side of the core material and second cladding material provided on a second side of the core material opposite to the first side, the core material comprising 0.5-1.2% of Si, 0.2-1.0% of Cu, 1.0-1.8% of Mn and 0.05-0.3% of Ti, with the balance being Al and unavoidable impurities, the first cladding material comprising 3-5% of Si, 2-8% of Zn and 0.3-1.8% of Mn, with the balance being Al and unavoidable impurities and the second cladding material comprising 6-13% of Si, with the balance being Al and unavoidable impurities, all of the % being mass %, characterized in that the aluminum alloy clad sheet is formed so that the first cladding material forms a convex surface and the second cladding material forms a concave surface and a refrigerant tube is assembled by placing two of the aluminum alloy clad sheets such that their concave surfaces face each other and are brazed so that the first cladding material comes into contact with air and the second cladding material comes into contact with a refrigerant.

2. The aluminum alloy clad sheet according to claim 1, wherein the core material further comprises at least one of 0.3% or less of Cr and 0.3% or less of Zr.

3. The aluminum alloy clad sheet according to claim 1, wherein the core material further comprises 0.5% or less of Mg.

4. The aluminum alloy clad sheet according to claim 1, wherein the first cladding material further comprises 0.005 to 0.05% of Sr.

5. The aluminum alloy clad sheet according to claim 2, wherein the first cladding material further comprises 0.005 to 0.05% of Sr.

6. The aluminum alloy clad sheet according to claim 1, wherein the first cladding material further comprises at least one of 0.3% or less of Cr and 0.3% or less of Zr.

7. The aluminum alloy clad sheet according to claim 1, wherein the first cladding material further comprises at least one of 0.001 to 0.1% of In and 0.001 to 0.1% of Sn.

8. The aluminum alloy clad sheet according to claim 1, wherein the first cladding material has an Ni content of less than 0.05%.

9. The aluminum alloy clad sheet according to claim 1, wherein the second cladding material further comprises 0.005 to 0.05% of Sr.

10. The aluminum alloy clad sheet according to claim 2, wherein the second cladding material further comprises 0.005 to 0.05% of Sr.

11. The aluminum alloy clad sheet according to claim 4, wherein the second cladding material further comprises 0.005 to 0.050 of Sr.

12. The aluminum alloy clad sheet according to claim 5, wherein the second cladding material further comprises 0.005 to 0.05% of Sr.

13. The aluminum alloy clad sheet according to claim 1, wherein the second cladding material further comprises 0.1 to 0.5% of Cu.

14. The refrigerant tube of claim 1.

15. An aluminum alloy clad sheet according to claim 1, wherein the first cladding material further comprises 0.05-0.3% of Ti.

16. The aluminum alloy clad sheet according to claim 1, wherein the first cladding material contains 1.0-1.8% Mn.

17. The aluminum alloy clad sheet according to claim 16, wherein the first cladding material contains 1.3-1.8% Mn.

18. An aluminum alloy clad sheet for a tube material of a heat exchanger, comprising a core material and a cladding material provided on a side of the core material, the core material comprising 0.5-1.2% of Si; 0.2-1.0% of Cu, 1.0-1.8% of Mn and 0.05-0.3% Ti, with the balance being Al and unavoidable impurities and the cladding material comprises 3-5% of Si, 2-8% of Zn and 0.3-1.8% of Mn, with the balance being Al and unavoidable impurities, all of the % being mass %, characterized in that the aluminum alloy clad sheet is formed so that the cladding material forms a convex surface and the core material forms a concave surface and a refrigerant tube is assembled by placing two of the aluminum alloy clad sheets such that their concave surfaces face each other and are brazed such that the cladding material comes into contact with air and the core material comes into contact with a refrigerant.

19. The aluminum alloy clad sheet according to claim 18, wherein the cladding material further comprises at least one of 0.3% or less of Cr and 0.3% or less of Zr.

20. The aluminum alloy clad sheet according to claim 18, wherein the core material further comprises 0.5% or less of Mg.

21. The aluminum alloy clad sheet according to claim 18, wherein the cladding material further comprises 0.005 to 0.05% of Sr.

22. The aluminum alloy clad sheet according to claim 19, wherein the cladding material further comprises 0.005 to 0.05% of Sr.

23. The aluminum alloy clad sheet according to claim 18, wherein the cladding material further comprises at least one of 0.3% or less of Cr and 0.3% or less of Zr.

24. The aluminum alloy clad sheet according to claim 18, wherein the cladding material further comprises at least one of 0.001 to 0.1% of In and 0.001 to 0.1% of Sn.

25. The aluminum alloy clad sheet according to claim 18, wherein the cladding material has an Ni content of less than 0.05%.

26. The refrigerant tube of claim 18.

27. An aluminum alloy clad sheet according to claim 18, wherein the cladding material further comprises 0.05-0.3% of Ti.

28. The aluminum alloy clad sheet according to claim 18, wherein the cladding material contains 1.0-1.8% Mn.

29. The aluminum alloy clad sheet according to claim 28, wherein the cladding material contains 1.3-1.8% Mn.

\* \* \* \* \*